United States Patent Office 3,690,822
Patented Sept. 12, 1972

3,690,822
HIGHLY SILICEOUS SOLID SODIUM SILICATE
Clyde B. Myers, 7744 Fairlawn Drive,
Mentor, Ohio 44060
No Drawing. Continuation-in-part of abandoned application Ser. No. 738,771, June 21, 1968. This application Dec. 21, 1970, Ser. No. 100,444
Int. Cl. C01b 33/32
U.S. Cl. 423—334
5 Claims

ABSTRACT OF THE DISCLOSURE

A process is described for preparing a solid sodium silicate having a $SiO_2:Na_2O$ weight ratio from about 4.0:1–5.3:1 by the direct reaction of a mixture of 40–60 percent water, a soluble sodium silicate having a ratio of less than 4.0:1 and an amorphous finely-divided silica, the amount of silica being sufficient to yield, in combination with the sodium silicate, the desired final weight ratio. Reaction takes place at a temperature less than that at which intumescence occurs. The water-soluble, high water content, solid product so obtained is also described.

REFERENCE TO A CO-PENDING APPLICATION

This is a continuation-in-part of U.S. Ser. No. 738,771, filed June 21, 1968, now abandoned.

BACKGROUND OF THE INVENTION

Sodium silicates having $SiO_2:Na_2O$ weight ratios in excess of 3.4:1 are not generally readily available on a commercial basis. In some instances silicates having weight ratios as high as 3.75:1 have been available but these and more siliceous silicates are in limited production and are available only at a premium cost. Furthermore, the user of such silicates is limited to the weight ratios available from the manufacturer's plant and these are generally quite limited in number.

For some purposes however, it is necessary or desirable to make use of sodium silicates having weight ratios in excess of 4.0:1. One illustration of such a use would be in the insulation industry where foamed sodium silicates having a high silica content would be useful in the fabrication of thermal or acoustical insulation having a high resistance to water. Such foams would also be useful as flotation materials or as shock-absorbing materials for dropping fragile items by parachute.

Obviously, the production of a foam such as described above requires as a starting material a sodium silicate having a relatively low water content, since the product is to be foamed into a rigid material and hence the water must be removed, and a relatively high $SiO_2:Na_2O$ ratio, since it is known that the more siliceous silicates are less water soluble in their anhydrous forms. However, in attempting to provide such sodium silicates at a reasonable cost, problems have been encountered.

Sodium silicates are generally formed by the reaction of an alkaline material and sand at elevated temperatures to provide a silicate glass. However, sodium silicate glasses having weight ratios in excess of 4.0:1 have extremely high melting temperatures, e.g., a silicate having a weight ratio of 4.5:1 has a melting point of about 1235° C. Consequently, this route is uneconomic and impractical owing to the difficulties involved in achieving and maintaining such high temperatures routinely. Furthermore, such silicate glasses, when produced have such a low degree of water solubility as to make them essentially impossible to dissolve. Hence the fusion process could not provide the desired sodium silicate in a form useful for producing foamed materials.

Methods of producing sodium silicates having weight ratios in excess of 4.0:1 by other than the fusion process have been disclosed in the prior art. These silicates however, have been either liquids of high, or relatively high, water content or insoluble crystalline materials. The crystalline materials are generally prepared by the decomposition, controlled or not, of a conventional aqueous sodium silicate solution. Under certain severe conditions, crystalline sodium polysilicates will separate from an aqueous sodium silicate solution as a discrete mass. These crystals may then be separated from the solution by washing, thus evidencing their water insolubility. Such crystals, however, cannot be directly foamed to provide an insulation material.

On the other extreme, it is known to produce sodium silicates of extremely high weight ratios by the slow and controlled addition of a dilute silica aquasol to a hot aqueous solution of sodium silicate. This colloidal silica aquasol must be both free from electrolyte and freshly prepared in order for the reaction to proceed satisfactorily. The product obtained, however, generally contains less than five percent solids and is economically impractical for most applications.

A more recent suggestion has been that a sodium silicate having a weight ratio in excess of 4.0:1 can be prepared which has a solids content within the range of 10–30 percent and contains no crystalline polysilicates. This is accomplished by the controlled reaction of an aqueous sodium silicate solution with a colloidal amorphous silica. The resultant silicate is said to be unique in that its viscosity is quite low, on the order of less than 100 centipoises. Efforts to provide a more concentrated, i.e., lower water content, material from the silicate are hampered however by the fact that exposure to elevated temperatures results in decomposition of the silicate, yielding the undesired and insoluble crystalline sodium polysilicates of the prior art.

STATEMENT OF THE INVENTION

Therefore it is an object of the present invention to provide a solid, readily water-soluble sodium silicate having a $SiO_2:Na_2O$ weight ratio in excess of 4.0:1 by a process involving the reaction of a lower weight ratio sodium silicate with a silica material under non-rigorous conditions.

It is a further object of the present invention to provide an economical process for the production of solid sodium silicates having $SiO_2:Na_2O$ weight ratios in excess of 4.0:1, which silicates are useful in the production of foamed silicate materials.

These and advantages of the present invention will become apparent to one skilled in the art from the specifications and claims which follow.

A process has now been found for preparing a solid sodium silicate having a $SiO_2:Na_2O$ weight ratio of from greater than 4.0:1 to about 5.3:1, which process consists essentially of mixing from 40–60 percent water, a soluble sodium silicate having a weight ratio of less than 4.0:1 and an amorphous finely-divided silica, said silica being present in an amount sufficient to give, in combination with said silicate, a $SiO_2:Na_2O$ ratio within the range of from greater than 4.0:1 to about 5.3:1, and causing the resultant mixture to react at a temperature less than that at which intumescence occurs for a period of time sufficient to substantially complete the reaction. This process provides a method for directly obtaining a high water content, solid, water-soluble sodium silicate.

DESCRIPTION OF THE PREFERRED EMBODIMENTS

Conveniently, the sodium silicates used in the process of the present invention will be the commercially available aqueous sodium silicates since a specified amount, i.e., 40–60, preferably 52–58, percent, of water is required for the reaction and to impart water soluble characteristics to the reaction product. These commercially available aqueous sodium silicate solutions, in combination with the amorphous silica, generally result in the desired amount of water. However, should the sodium silicate starting material not contain a sufficient amount, water may be added to the desired range. Generally it is not critical that the starting sodium silicate have any particular $SiO_2:Na_2O$ weight ratio. However, as a practical consideration it is advisable to use a soluble sodium silicate having a relatively high $SiO_2:Na_2O$ weight ratio since sodium silicate is generally less expensive than amorphous silica. For example, a preferred starting material is a sodium silicate solution containing 38.3 percent solids and having a $SiO_2:Na_2O$ weight ratio of 3.22:1.0.

Generally speaking, any source of finely-divided amorphous silica is useful in the practice of the present invention. Typically, however, because only a limited quantity of water is desired in the system and for economic reasons, the silica used will be those available to the industry as silica pigments. These silicas are often relatively impure, containing, typically, 80–90 percent by weight $SiO_2$, the remainder being mainly water, plus relatively minor impurities such as alkali metal salts, metal oxides and the like, which impurities, however, are generally harmless in the practice of the present invention. More pure materials may of course be used. Illustrative of the silicas useful in the practice of the present invention are Hi-Sil, a trademark of the Columbia Southern Chemical Corporation for a hydrated silica pigment and Zeosyl–100, trademark of the J. M. Huber Company. Crystalline sources of silica, even in finely-divided form such as silica flour, are not useful in the practice of the present invention.

It will be obvious to one skilled in the art that the quantity of amorphous silica to be used in combination with the sodium silicate depends upon the desired final weight ratio. Therefore, the quantities will depend upon the alkalinity and solids content of the aqueous sodium silicate starting material as well as the silica content of the amorphous silica used. These quantities may be readily calculated at the time of use. As an illustration, a solid sodium silicate having a weight ratio of 4.5:1 and a water content of 55.3 percent may be produced using 100 grams of aqueous sodium silicate solution, which solution contains 38.3 percent solids and has a weight ratio of 3.22:1, and 14.3 grams of amorphus silica, containing 90 percent $SiO_2$.

It has been found, surprisingly, that there is a practical upper limit to the $SiO_2:Na_2O$ weight ratio which may be obtained according to the present invention, this limit being about 5.3:1. While quantities of amorphous silica added to sodium silicate solutions having weight ratios of less than 4.0:1 react with 100 percent efficiency up to a theoretical weight ratio of 5.2:1, after this value is reached, efficiencies fall off rapidly with the effect that the excess silica remains unreacted and suspended in a homogeneous solid sodium silicate having a weight ratio within the range of 5.2–5.3:1.

As is set forth hereinabove, formation of the desired solid sodium silicate involves the intimate mixing of water, sodium silicate and amorphous silica. This mixing stage is relatvely important to the overall operation. To date the best manner of effecting this mixture has been to slowly add, with constant mixing, an aqueous alkali metal silicate to amorphous silica. If added water is needed, it is preferred to add it to the sodium silicate prior to addition to the silica. During the course of addition and mixing, the amorphous silica will change from an essentially dry, free-flowing powder to a wetted, viscous material which requires the application of powerful forces to insure adequate mixing. In general, mixing is best accomplished using high torque, low speed mixers, such as a Sigma blade mixer. Once intimate contact of the aqueous silicate with the amorphous silica has been achieved the reaction will proceed without further encouragement. However, as a practical matter and in order to speed the reaction, mixing is continued, usually with the application of heat, preferably to within the range of 60–80° C. Higher temperatures appear to have little effect upon the speed or efficiency of the reaction, although temperatures up to that point at which intumescence occurs may be employed provided steps are taken to prevent excessive moisture losses. Intumescence is understood to mean the foaming of the sodium silicate which occurs on loss or vaporization of contained water, usually commencing at about 100° C. Reaction is complete when a sample of the sodium silicate removed from the vessel and dissolved in water exhibits no traces of unreacted, undissolved, amorphous silica.

It is stated above that the reaction mixture is to contain between 40 and 60, preferably 52–58, percent water. Reaction of mixtures containing amounts of water within this range yields sodium silicates in the desired physical form without further treatment. Attempts to use amounts of water substantially beneath the stated range lead to problems in obtaining a uniform admixture of materials, to incomplete reaction of the silica and to the formation of silicate "lumps" which defy conventional mechanical mixing apparatus. On the other hand, amounts of water greater than 60 percent tend to quench the reaction, that is, substantially increase the amount of time required to obtain a sodium silicate free from undissolved $SiO_2$, and at the same time result in a product which, while viscous, does not fit the definition of solid material.

In order that those skilled in the art may more readily understand the present invention and certain preferred embodiments by which it may be carried into effect, the following illustrative examples are afforded.

EXAMPLE

The following table is for the most part self-explanatory. In this table the amorphous $SiO_2$ is supplied in the form of Zeosyl–100 which contains approximately 85% $SiO_2$, 4% impurities and the remainder water. The silicate is supplied as an aqueous sodium silicate solution having weight ratio of 3.22:1 and a solids content of 38.3%. Thus the amount of water represents that in the silica, the commercial silicate material and any added water. In each instance the aqueous sodium silicate is added slowly to the silica with agitation by a high torque, low speed, Sigma blade mixer. Heat is supplied to the mixture, contained in a stream-jacketed pot, to a temperature of about 80° C.

TABLE

| Sample No. | 3.22 $SiO_2:Na_2O$ (gms.) | Amorphous $SiO_2$ (gms.) | $H_2O$ (gms.) | $H_2O$, percent (mixture) | Ratio $SiO_2:Na_2O$ (theoretical) | Reaction time (hrs.) | Ratio $SiO_2:Na_2O$ (actual) | $H_2O$, percent (product) |
|---|---|---|---|---|---|---|---|---|
| 1 | 322 | 97 | 530 | 55.5 | 4.48 | 0.75 | 4.48 | 52.7 |
| 2 | 322 | 97 | 601 | 58.6 | 4.48 | 4 | 4.44 | 57.8 |
| 3 | 322 | 110 | 532 | 54.9 | 4.65 | 1 | 4.65 | 53.0 |
| 4 | 282 | 133 | 533 | 55.9 | 5.20 | 1 | 5.17 | 54.2 |
| 5 | 275 | 141 | 532 | 55.8 | 5.38 | 1 | 5.22 | 53.7 |
| 6 | 264 | 151 | 471 | 52.7 | 5.65 | 3 | 5.24 | 51.0 |
| 7 | 264 | 151 | 599 | 58.6 | 5.65 | 24 | 5.24 | 58.0 |
| 8 | 256 | 156 | 534 | 55.7 | 5.79 | <4 | 5.25 | 53.9 |

Each of the products of the foregoing table is a solid, readily soluble (in cold water) sodium silicate of high water content. It is to be noted that samples 5–8, which have theoretical weight ratios in excess of 5.2:1, contain unreacted quantities of amorphous silica. Sample 6 shows that a decrease in water content coupled with an increase in reaction time does not substantially raise the ultimate ratio above 5.2:1. Sample 7 shows that an increase in water content together with a much extended reaction time still is of no effect.

The present invention has been described with reference to preferred and specific embodiments thereof, however, the scope of the invention is not to be so limited since certain changes and alterations may be made therein which are within the full and intended scope of the appended claims.

I claim:

1. A process for preparing a highly-hydrated solid sodium silicate having a $SiO_2:Na_2O$ weight ratio of from greater than 4.0:1 to 5.3:1, which process consists essentially of intimately admixing:
   (a) a soluble sodium silicate having a $SiO_2:Na_2O$ weight ratio of less than 4.0:1;
   (b) an amorphous finely-divided silica in an amount sufficient to give, in combination with said sodium silicate, a $SiO_2:Na_2O$ weight ratio of from greater than 4.0:1 to 5.3:1 and,
   (c) as the balance, sufficient water to give a total water content in the mixture of from 40 to 60% by weight,
causing said mixture to react at a temperature less than that at which intumescence occurs and continuing said reaction for a period of time sufficient to substantially complete the reaction, whereby a water-soluble, solid, sodium silicate having a water content of about 40–60% and a $SiO_2:Na_2O$ weight ratio within the range of from greater 4.0:1 to 5.3:1 is obtained.

2. A process as in claim 1 wherein the silicate is an aqueous sodium silicate added to the silica.

3. A process as in claim 1 wherein the mixing step includes 52–58% water.

4. A process as in claim 1 wherein the reaction occurs at a temperature within the range of 60–80° C.

5. A process for preparing a highly-hydrated solid sodium silicate having a $SiO_2:Na_2O$ weight ratio of from greater than 4.0:1 to 5.3:1, which process consists essentially of intimately admixing:
   (a) an aqueous sodium silicate solution having a $SiO_2:Na_2O$ weight ratio of less than 3.4:1;
   (b) an essentially-dry, amorphous, free-flowing, finely-divided silica in an amount sufficient to give, in combination with said sodium silicate, a $SiO_2:Na_2O$ weight raitio of from greater than 4.0:1 to 5.3:1, and,
   (c) as the balance, sufficient water to give a total water content in the mixture of 40 to 60% by weight,
causing said mixture to react by continued mixing of the now-viscous material at a temperature within the range of from 60°–80° C. and continuing reaction for a period of time sufficient to substantially complete said reaction, whereby a water-soluble, solid sodium silicate having a water content of about 40 to 60% and a $SiO_2:Na_2O$ weight ratio within the range of from greater than 4.0:1 to 5.3:1 is obtained.

References Cited

UNITED STATES PATENTS 3,492,137  1/1970  Iler _____ 106—74

FOREIGN PATENTS 587,742  11/1959  Canada _____ 23—110

OTHER REFERENCES

Journ. of Amer. Chem. Soc., vol. 74, No. 10, May 1952, pp. 2453–2456.

EDWARD STERN, Primary Examiner

U.S. Cl. X.R.

106—74

UNITED STATES PATENT OFFICE
CERTIFICATE OF CORRECTION

Patent No. 3,690,822             Dated September 12, 1972

Inventor(s) Clyde B. Myers

It is certified that error appears in the above-identified patent and that said Letters Patent are hereby corrected as shown below:

In the heading, after the inventor Clyde B. Myer's address, insert --, assignor to Diamond Shamrock Corporation, Cleveland, Ohio--

Signed and sealed this 13th day of March 1973.

(SEAL)
Attest:

EDWARD M. FLETCHER, JR.              ROBERT GOTTSCHALK
Attesting Officer                    Commissioner of Patents